US009456449B2

(12) United States Patent
Terry et al.

(10) Patent No.: US 9,456,449 B2
(45) Date of Patent: *Sep. 27, 2016

(54) CHANNEL QUALITY MEASUREMENTS FOR DOWNLINK RESOURCE ALLOCATION

(71) Applicant: INTERDIGITAL TECHNOLOGY CORPORATION, Wilmington, DE (US)

(72) Inventors: Stephen E. Terry, Northport, NY (US);
Stephen G. Dick, Nesconset, NY (US);
James M. Miller, Verona, NJ (US);
Eldad Zeira, Huntington, NY (US);
Ariela Zeira, Huntington, NY (US)

(73) Assignee: INTERDIGITAL TECHNOLOGY CORPORATION, Wilmington, DE (US)

( * ) Notice: Subject to any disclaimer, the term of this patent is extended or adjusted under 35 U.S.C. 154(b) by 11 days.

This patent is subject to a terminal disclaimer.

(21) Appl. No.: 14/055,315

(22) Filed: Oct. 16, 2013

(65) Prior Publication Data

US 2014/0043996 A1    Feb. 13, 2014

Related U.S. Application Data

(63) Continuation of application No. 13/453,258, filed on Apr. 23, 2012, now Pat. No. 8,675,612, which is a continuation of application No. 10/145,555, filed on May 14, 2002, now Pat. No. 8,199,726.

(60) Provisional application No. 60/290,739, filed on May 14, 2001.

(51) Int. Cl.
*H04B 7/216*    (2006.01)
*H04W 72/08*    (2009.01)
(Continued)

(52) U.S. Cl.
CPC ......... *H04W 72/085* (2013.01); *H04B 17/327* (2015.01); *H04B 17/382* (2015.01);
(Continued)

(58) Field of Classification Search
CPC ............. H04W 72/085; H04W 52/24; H04W 72/0413; H04L 1/0001; H04L 1/0003; H04L 1/0009; H04L 1/0026; H04L 1/0027; H04L 1/0028; H04L 1/20; H04B 17/327; H04B 17/382
See application file for complete search history.

(56) References Cited

U.S. PATENT DOCUMENTS

| 4,679,227 A | 7/1987 | Hughes-Hartogs |
| 4,731,816 A | 3/1988 | Hughes-Hartogs |

(Continued)

FOREIGN PATENT DOCUMENTS

| AU | 2002247030 B2 | 9/2006 |
| CA | 2230778 A1 | 12/1997 |

(Continued)

OTHER PUBLICATIONS

3rd Generation Partnership Project (3GPP), 12A(01)-0028, "Variable DL-Channel Quality Feedback Rate for HSDPA", Sony Corporation, TSG-RAN2, RAN1 HSDPA Ad-Hoc, Sophia, Antipolis, Apr. 5-6, 2001, 5 pages.

(Continued)

*Primary Examiner* — Clemence Han
(74) *Attorney, Agent, or Firm* — Condo Roccia Koptiw LLP

(57) ABSTRACT

A method for reporting channel quality from a user equipment (UE) to a base station is described. The UE derives a channel quality for each of a plurality of downlink resources. The UE transmits channel quality reports in a pattern of time intervals by rotating through the plurality of downlink resources in different time intervals of the pattern, wherein a channel quality report is not transmitted by the UE in each time interval of a frame.

36 Claims, 3 Drawing Sheets

(51) Int. Cl.

| | | |
|---|---|---|
| *H04L 1/00* | (2006.01) | |
| *H04L 1/20* | (2006.01) | |
| *H04W 72/04* | (2009.01) | |
| *H04B 17/327* | (2015.01) | |
| *H04B 17/382* | (2015.01) | |
| *H04W 52/24* | (2009.01) | |

(52) U.S. Cl.
CPC .......... *H04L1/0001* (2013.01); *H04L 1/0026* (2013.01); *H04L 1/0027* (2013.01); *H04L 1/0028* (2013.01); *H04L 1/20* (2013.01); *H04W 72/0413* (2013.01); *H04L 1/0003* (2013.01); *H04L 1/0009* (2013.01); *H04W 52/24* (2013.01)

(56) References Cited

U.S. PATENT DOCUMENTS

| | | |
|---|---|---|
| 5,539,780 A | 7/1996 | Dutkiewicz |
| 5,566,165 A | 10/1996 | Sawahashi et al. |
| 5,623,486 A | 4/1997 | Dohi et al. |
| 5,799,005 A * | 8/1998 | Soliman ............. 370/335 |
| 5,898,682 A | 4/1999 | Kanai |
| 5,960,335 A | 9/1999 | Umemoto et al. |
| 6,005,893 A | 12/1999 | Hyll |
| 6,034,952 A | 3/2000 | Dohi et al. |
| 6,108,374 A | 8/2000 | Balachandran et al. |
| 6,167,031 A | 12/2000 | Olofsson et al. |
| 6,175,590 B1 | 1/2001 | Stein |
| 6,215,827 B1 | 4/2001 | Balachandran et al. |
| 6,341,224 B1 | 1/2002 | Dohi et al. |
| 6,366,763 B1 | 4/2002 | Ue et al. |
| 6,498,625 B1 | 12/2002 | Yamamoto et al. |
| 6,667,965 B1 | 12/2003 | Yamaura et al. |
| 6,700,881 B1 | 3/2004 | Kong et al. |
| 6,754,506 B2 | 6/2004 | Chang et al. |
| 6,856,812 B1 | 2/2005 | Budka et al. |
| 6,865,233 B1 * | 3/2005 | Eriksson et al. ............. 375/261 |
| 6,940,839 B2 | 9/2005 | Miyamoto |
| 6,975,604 B1 | 12/2005 | Ishida et al. |
| 7,020,483 B2 | 3/2006 | Oestreich |
| 7,986,672 B2 | 7/2011 | Tiedemann, Jr. et al. |
| 8,199,726 B2 * | 6/2012 | Terry et al. .................. 370/335 |
| 8,675,612 B2 * | 3/2014 | Terry et al. .................. 370/335 |
| 2002/0094833 A1 | 7/2002 | Lieshout et al. |
| 2002/0110088 A1 | 8/2002 | Lundby et al. |
| 2002/0110101 A1 | 8/2002 | Gopalakrishnan et al. |
| 2002/0160781 A1 | 10/2002 | Bark et al. |
| 2003/0099209 A1 | 5/2003 | Laakso et al. |
| 2003/0128674 A1 | 7/2003 | Kong et al. |
| 2005/0002468 A1 | 1/2005 | Walton et al. |
| 2005/0063332 A1 | 3/2005 | Holtzman et al. |
| 2007/0066320 A1 | 3/2007 | Padovani et al. |
| 2012/0207051 A1 | 8/2012 | Terry et al. |

FOREIGN PATENT DOCUMENTS

| | | |
|---|---|---|
| CA | 2293606 A1 | 10/1999 |
| CN | 1130851 A | 9/1996 |
| CN | 1237074 A | 12/1999 |
| EP | 0683570 A2 | 11/1995 |
| EP | 0954117 A1 | 11/1999 |
| EP | 0961449 A2 | 12/1999 |
| EP | 0986282 A1 | 3/2000 |
| EP | 1094629 A2 | 4/2001 |
| JP | 04-200032 A | 7/1992 |
| JP | 04-252569 A | 9/1992 |
| JP | 09-128212 A | 5/1997 |
| JP | 09-233022 A | 9/1997 |
| JP | 10-013364 A | 1/1998 |
| JP | 10-056420 A | 2/1998 |
| JP | 2000-040997 A | 2/2000 |
| JP | 2001-000754 A | 1/2001 |
| JP | 2001-007754 A | 1/2001 |
| JP | 2004-531114 A | 10/2004 |
| JP | 5265747 B2 | 8/2013 |
| JP | 2015095196 A | 5/2015 |
| KR | 10-2007-0055641 A | 5/2007 |
| WO | WO 97/13388 A1 | 4/1997 |
| WO | WO 97/18643 A1 | 5/1997 |
| WO | WO 98/51111 A1 | 11/1998 |
| WO | WO 99/12304 A1 | 3/1999 |
| WO | WO 99/43100 A1 | 8/1999 |
| WO | WO 99/43101 A1 | 8/1999 |
| WO | WO 99/67971 A2 | 12/1999 |
| WO | WO 00/14900 A1 | 3/2000 |
| WO | WO 00/49760 A1 | 8/2000 |
| WO | WO 00/57658 A1 | 9/2000 |
| WO | WO 00/62465 A1 | 10/2000 |
| WO | WO 01/33744 A1 | 5/2001 |
| WO | WO 01/35545 A2 | 5/2001 |

OTHER PUBLICATIONS

3rd Generation Partnership Project (3GPP), R1#14(00)0868, "Considerations on High-Speed Downlink Packet Access (HSDPA)", Nokia, TSG RAN WG1 Meeting#14, Jul. 4, 2000, pp. 1-9.

3rd Generation Partnership Project (3GPP), R2-011055, "Channel Quality Measurements for HSDPA-TDD", TSG-RAN Working Group 2, Busan, South Korea, May 21-25, 2001, 2 pages.

3rd Generation Partnership Project (3GPP), Tdoc 12A010008, "HSDPA Signaling in Uplink", Nokia, TSG-RAN WG1/WG2 adhoc on HSDPA, Apr. 5-6, 2001, pp. 1-10.

3rd Generation Partnership Project (3GPP), TR 25.848 V4.0.0, "Technical Specification Group Radio Access Network, Physical Layer Aspects of UTRA High Speed Downlink Packet Access (Release 4)", Mar. 2001, pp. 1-89.

3rd Generation Partnership Project (3GPP), TR 25.922 V3.5.0, "Technical Specification Group Radio Access Network, Radio Resource Management Strategies (Release 1999)", Mar. 2001, pp. 1-70.

3rd Generation Partnership Project (3GPP), TR 25.922 V3.7.0, "Technical Specification Group Radio Access Network, Radio Resource Management Strategies (Release 1999)", Mar. 2002, pp. 1-74.

3rd Generation Partnership Project (3GPP), TR 25.922 V4.0.0, "Technical Specification Group Radio Access Network, Radio Resource Management Strategies (Release 4)", Mar. 2001, pp. 1-70.

3rd Generation Partnership Project (3GPP), TR 25.922 V4.2.0, "Technical Specification Group Radio Access Network, Radio Resource Management Strategies (Release 4)", Mar. 2002, pp. 1-74.

3rd Generation Partnership Project (3GPP), TR 25.922 V5.0.0, "Technical Specification Group Radio Access Network, Radio Resource Management Strategies (Release 5)", Mar. 2002, pp. 1-74.

3rd Generation Partnership Project (3GPP), TS 25.214 V3.10.0, "Technical Specification Group Radio Access Network, Physical Layer Procedures (FDD), (Release 1999)", Mar. 2002, pp. 1-52.

3rd Generation Partnership Project (3GPP), TS 25.214 V3.6.0, "Technical Specification Group Radio Access Network, Physical Layer Procedures (FDD), (Release 1999)", Mar. 2001, pp. 1-47.

3rd Generation Partnership Project (3GPP), TS 25.214 V4.0.0, "Technical Specification Group Radio Access Network, Physical Layer Procedures (FDD), (Release 4)", Mar. 2001, pp. 1-47.

3rd Generation Partnership Project (3GPP), TS 25.214 V4.4.0, "Technical Specification Group Radio Access Network, Physical Layer Procedures (FDD), (Release 4)", Mar. 2002, pp. 1-53.

3rd Generation Partnership Project (3GPP), TS 25.214 V5.0.0, "Technical Specification Group Radio Access Network, Physical Layer Procedures (FDD), (Release 5)", Mar. 2002, pp. 1-56.

3rd Generation Partnership Project (3GPP), TS 25.222 V3.6.0, "Technical Specification Group Radio Access Network, Multiplexing and Channel Coding (TDD) (Release 1999)", Mar. 2001, pp. 1-39.

3rd Generation Partnership Project (3GPP), TS 25.222 V3.8.0, "Technical Specification Group Radio Access Network, Multiplexing and Channel Coding (TDD) (Release 1999)", Mar. 2002, pp. 1-39.

(56) References Cited

OTHER PUBLICATIONS

3rd Generation Partnership Project (3GPP), TS 25.222 V4.0.0, "Technical Specification Group Radio Access Network, Multiplexing and Channel Coding (TDD) (Release 4)", Mar. 2001, pp. 1-49.
3rd Generation Partnership Project (3GPP), TS 25.222 V4.3.0, "Technical Specification Group Radio Access Network, Multiplexing and Channel Coding (TDD) (Release 4)", Mar. 2002, pp. 1-49.
3rd Generation Partnership Project (3GPP), TS 25.222 V5.0.0, "Technical Specification Group Radio Access Network, Multiplexing and Channel Coding (TDD) (Release 5)", Mar. 2002, pp. 1-60.
3rd Generation Partnership Project (3GPP), TS 25.224 V3.10.0, "Technical Specification Group Radio Access Network, Physical Layer Procedures (TDD), (Release 1999)", Mar. 2002, pp. 1-22.
3rd Generation Partnership Project (3GPP), TS 25.224 V3.6.0, "Technical Specification Group Radio Access Network, Physical Layer Procedures (TDD), (Release 1999)", Mar. 2001, pp. 1-22.
3rd Generation Partnership Project (3GPP), TS 25.224 V4.0.0, "Technical Specification Group Radio Access Network, Physical Layer Procedures (TDD) (Release 4)", Mar. 2001, pp. 1-40.
3rd Generation Partnership Project (3GPP), TS 25.224 V4.4.0, "Technical Specification Group Radio Access Network, Physical Layer Procedures (TDD) (Release 4)", Mar. 2002, pp. 1-40.
3rd Generation Partnership Project (3GPP), TS 25.224 V5.0.0, "Technical Specification Group Radio Access Network, Physical Layer Procedures (TDD) (Release 5)", Mar. 2002, pp. 1-45.
3rd Generation Partnership Project (3GPP), TS 25.321 V3.11.0, "Technical Specification Group Radio Access Network, MAC Protocol Specification (Release 1999)", Mar. 2002, pp. 1-43.
3rd Generation Partnership Project (3GPP), TS 25.321 V3.7.0, "Technical Specification Group Radio Access Network, MAC Protocol Specification (Release 1999)", Mar. 2001, pp. 1-41.
3rd Generation Partnership Project (3GPP), TS 25.321 V4.0.0, "Technical Specification Group Radio Access Network, MAC Protocol Specification (Release 4)", Mar. 2001, pp. 1-42.
3rd Generation Partnership Project (3GPP), TS 25.321 V4.4.0, "Technical Specification Group Radio Access Network, MAC Protocol Specification (Release 4)", Mar. 2002, pp. 1-45.
3rd Generation Partnership Project (3GPP), TS 25.321 V5.0.0, "Technical Specification Group Radio Access Network, MAC Protocol Specification (Release 5)", Mar. 2002, pp. 1-52.
3rd Generation Partnership Project (3GPP), TS 25.331 V3.10.0, "Technical Specification Group Radio Access Network, Radio Resource Control (RRC), Protocol Specification (Release 1999)", Mar. 2002, pp. 1-824.
3rd Generation Partnership Project (3GPP), TS 25.331 V3.6.0, "Technical Specification Group Radio Access Network, RRC Protocol Specification (Release 1999)", Mar. 2001, pp. 1-708.
3rd Generation Partnership Project (3GPP), TS 25.331 V4.0.0, "Technical Specification Group Radio Access Network, RRC Protocol Specification (Release 4)", Mar. 2001, pp, 1-758.
3rd Generation Partnership Project (3GPP), TS 25.331 V4.4.0, "Technical Specification Group Radio Access Network, Radio Resource Control (RRC); Protocol Specification (Release 4)", Mar. 2002, pp. 1-891.
3rd Generation Partnership Project (3GPP), TS 25.331 V5.0.0, "Technical Specification Group Radio Access Network, Radio Resource Control (RRC), Protocol Specification (Release 5)", Mar. 2002, pp. 1-909.
3rd Generation Partnership Project (3GPP), TSGR1#18(01)0129, "Updated Text Proposal for AMCS Complexity Evaluation Section of TR25.848", Sony Corporation, TSG-RAN Working Group Meeting #18, Jan. 15-18, 2001, 4 pages.
$3^{rd}$ Generation Partnership Project (3GPP), TSGR1#6(99)850, "Required UE Measurements in UTRA/FDD", Ericsson, TSG-RAN Working Group 1 Meeting #6, Espoo, Finland, Jul. 13-16, 1999, 9 pages.
Reisenfeld et al., "Optimisation of the Quality of Service in a Fast Frequency Hopped Code Division Multiple Access Communication System by Dynamic Allocation of Modulation Parameters", IEEE Global, Telecommunications Conference, vol. 2, Nov. 8-12, pp. 1224-1229.
$3^{rd}$ Generation Partnership Project (3GPP), TS 36.213 V8.8.0, "$3^{rd}$ Generation Partnership Project; Technical Specification Group Radio Access Network; Evolved Universal Terrestrial Radio Access (E-UTRA); Physical layer procedures (Release 8)", Sep. 2009, 77 pages.

\* cited by examiner

CHANNEL QUALITY MEASUREMENTS FOR DOWNLINK RESOURCE ALLOCATION

CROSS REFERENCE TO RELATED APPLICATIONS

This application is a continuation of U.S. patent application Ser. No. 13/453,258, filed Apr. 23, 2012, which is a continuation of U.S. patent application Ser. No. 10/145,555, filed May 14, 2002, which claims the benefit of U.S. Provisional Patent Application No. 60/290,739, filed May 14, 2001, which are incorporated by reference as if fully set forth herein.

BACKGROUND

The present invention relates to wireless digital communication systems, and more particularly, to communication stations employing code-division multiple access (CDMA) technology utilizing measurement techniques to efficiently determine downlink resource allocation.

In modern wireless communication systems, as the makeup of communication traffic has shifted from primarily voice traffic to an ever-increasing share of data traffic, such as for internet applications, the capacity requirements of such systems have increased. Thus, the provision of techniques to maximize the capacity of downlink (DL) transmissions is highly desirable.

The propagation loss between a transmitter and a receiver is not fixed or constant. In addition to the dependence of propagation loss on distance, variations are caused by obstructions to the path (or multiple paths) between the transmitter and receiver as well as the interaction between paths. These variations are referred to as fading. Additionally, the fading varies with time.

In some communication systems, it is customary to transmit at each time instance to a particular user, or several users among multiple users, who enjoy the most favorable transmission conditions at that time. With these systems, it is necessary to define a channel quality that may be estimated for each user from time to time in order to transmit to each user at the most appropriate moment. Although selection of the most appropriate moment from the fading point of view is not mandatory, instantaneous path loss should be one of the considered factors in the selection.

One measure of channel quality is the instantaneous path loss. Channel quality improves as the instantaneous path loss is reduced, and channel quality is best when the instantaneous path loss is the smallest.

Another measure of channel quality is the interference seen by the user, since higher interference generally requires higher transmission power. As transmission power is limited, it results in reduction of system capacity. Channel quality (CQ) may therefore be defined as the ratio of the received power of a fixed-level base station transmission to the received interference. This ratio is inversely proportional to the required transmission power of the base station for user data. Maximization of this ratio, by continually selecting the users whose CQ is highest (and therefore path loss and/or interference is lowest) at any instant in time, tends to increase system capacity as a whole over time.

The particular signal that is measured to determine the path loss and calculate the ratio is not critical. For example, the signal may be any pilot signal, beacon or even data-carrying signal that is transmitted at a constant or known power. In some systems the reception power is termed received signal code power (RSCP) and the received interference power is termed interference signal code power (ISCP). For example, in the Universal Mobile Telecommunication Systems (UMTS) frequency division duplex (FDD) standard, the common pilot channel (CPiCH) is measured, and the CQ is defined as CPiCH_RSCP/ISCP. In the UMTS time division duplex (TDD) standard, the beacon channel (PCCPCH) is measured and the CQ is defined as PCCPCH_RSCP/ISCP. Since channel conditions change rapidly, it is preferable to use a short time allocation (i.e., a small timeslot) for each transmission. The measurement information used for the allocation must therefore also be timely.

In some communication systems it is customary to separate transmissions to users by time, or to separate one type of user-selective transmission in time from other types of transmissions, such as normal voice services and data services. Such time separation can be obtained in different ways. For example, a repetitive frame may be divided into a plurality of timeslots. Each timeslot may each be allocated to one or more users at a time. In addition, several timeslots, adjacent or non-adjacent, may be allocated to one or more users. If a collection of one or more timeslots is allocated together, it may be referred to as a sub-channel.

In a time-separated transmission, it is likely that the interference in all of the timeslots or sub-channels is not equal. The reporting of a single value for all timeslots often results in a non-optimal allocation and the information in some of the timeslots may be lost. It is therefore desirable to report individual measurements for each timeslot.

SUMMARY

The present invention provides for timely measurement of CQ and for signaling the information to the base station as appropriate. The present invention provides several embodiments to measure and signal the CQ per timeslot, or sub-channel, from the UE to the base station. Measurements may be performed at a high rate for all relevant timeslots or sub-channels, or may be made at a lower rate by selectively reducing the rate by which such measurements are performed.

A method for reporting channel quality from a user equipment (UE) to a base station is described. The UE derives a channel quality for each of a plurality of downlink resources. The UE transmits channel quality reports in a pattern of time intervals by rotating through the plurality of downlink resources in different time intervals of the pattern, wherein a channel quality report is not transmitted by the UE in each time interval of a frame.

A UE configured to report a channel quality to a base station includes a channel quality determination device and a channel quality transmitter. The channel quality determination device is configured to derive a channel quality for each of a plurality of downlink resources. The channel quality transmitter is configured to transmit channel quality reports in a pattern of time intervals by rotating through the plurality of downlink resources in different time intervals of the pattern, wherein a channel quality report is not transmitted by the UE in each time interval of a frame.

A wireless network node for receiving channel quality information from a user equipment includes a channel quality receiver configured to receive channel quality reports in a pattern of time intervals. The channel quality reports rotate through a plurality of downlink resources in different time intervals of the pattern and a channel quality report is not received from the UE in each time interval of a frame.

BRIEF DESCRIPTION OF THE DRAWINGS

The objectives of the present invention will become apparent upon consideration of the accompanying detailed description and figures, in which.

DETAILED DESCRIPTION OF THE PREFERRED EMBODIMENTS

Figure 1:
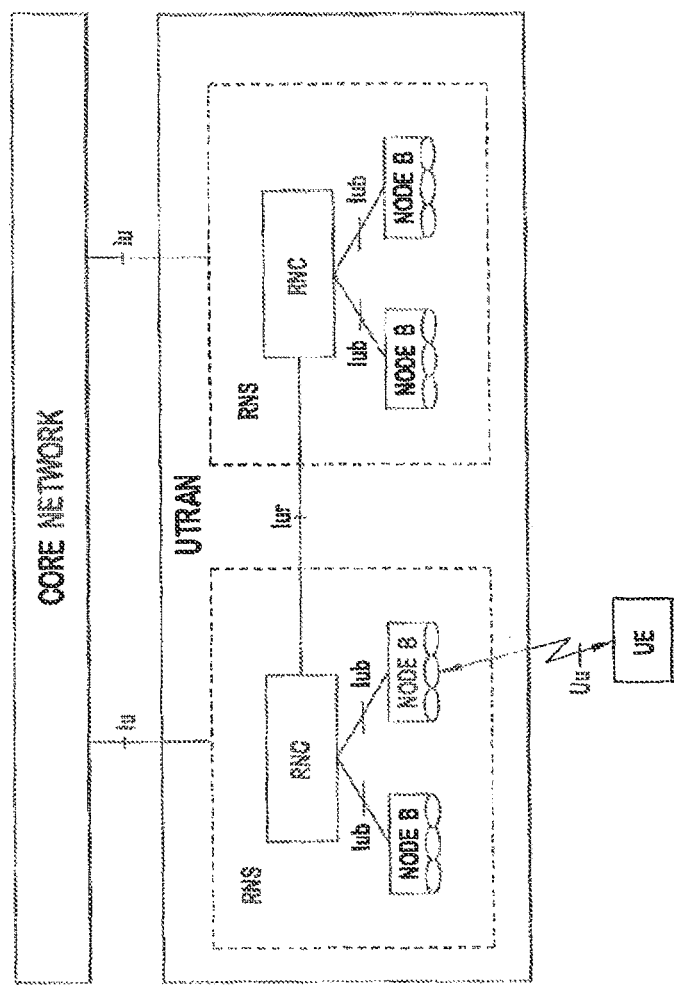
FIG. 1 is a simplified block diagram of the UMTS architecture.

Presently preferred embodiments are described below with reference to the drawing figures wherein like numerals represent like elements throughout.

Referring to FIG. 1, the UMTS network architecture includes a core network (CN), a UMTS Terrestrial Radio Access Network (UTRAN), and a User Equipment (UE). The two general interfaces are the Iu interface, between the UTRAN and the core network, as well as the radio interface Uu, between the UTRAN and the UE. The UTRAN consists of several Radio Network Subsystems (RNS) which can be interconnected by an Iur interface. This interconnection allows core network independent procedures between different RNSs. Therefore, radio access technology-specific functions can be kept outside of the core network. The RNS is further divided into the Radio Network Controller (RNC) and several base stations (Node Bs). The Node Bs are connected to the RNC by an Iub interface. One Node B can serve one or multiple cells, and typically serves a plurality of UEs. The UTRAN supports both FDD mode and TDD mode on the radio interface. For both modes, the same network architecture and the same protocols are used.

Figure 2:
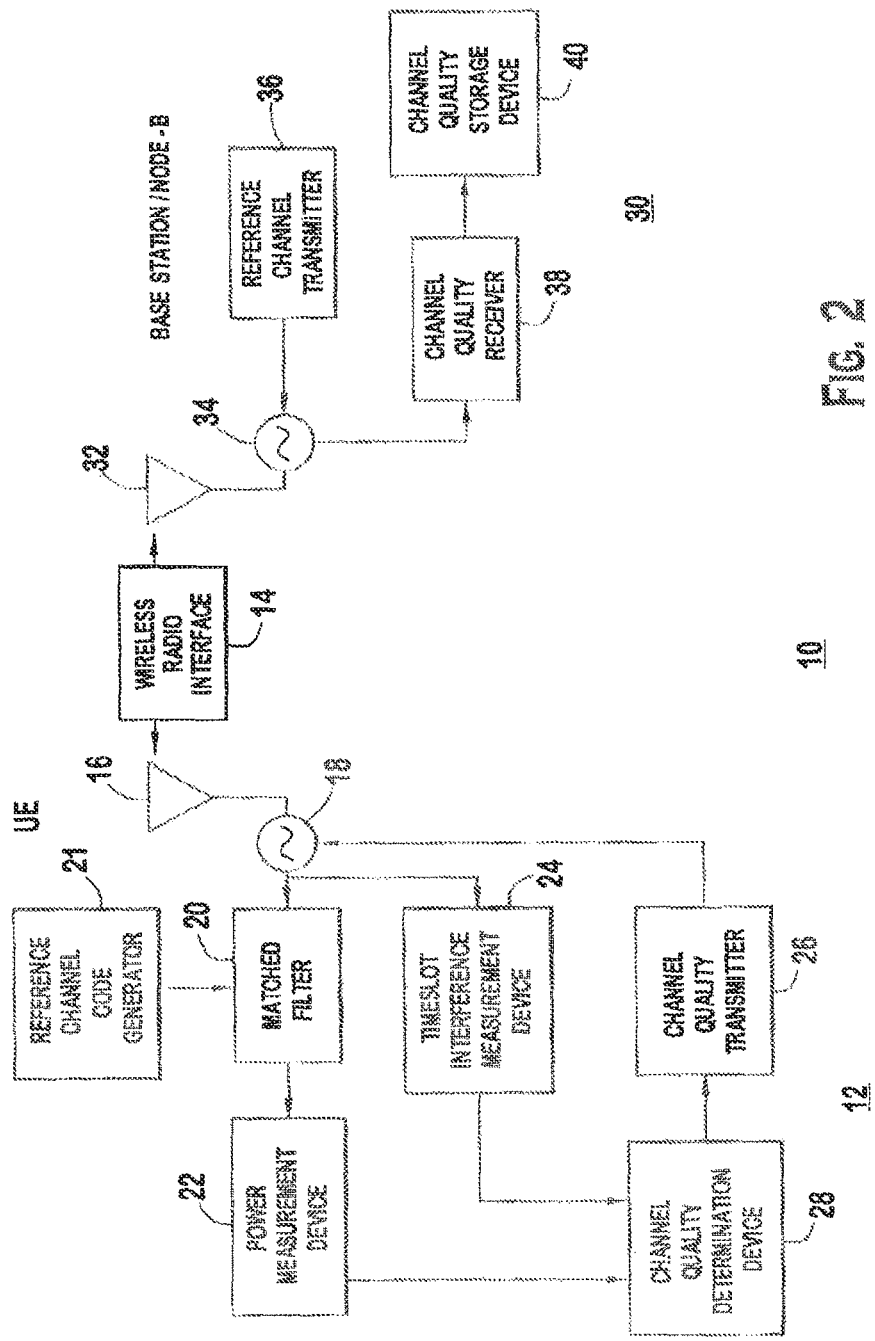
FIG. 2 is a simplified block diagram illustrating a UE and a base station for implementing channel quality measurements for downlink resource allocation of the present invention.

Referring to the block diagram in FIG. 2, a preferred communication system 10 for performing the process of obtaining CQ measurements for downlink resource allocation in accordance with the principles of the present invention is shown. The communication system 10 comprises a UE 12 and a base station/node-B 30, (hereinafter referred to as base station 30) which are coupled together via a wireless radio interface 14.

UE 12 includes an antenna 16, an isolator or switch 18, a matched filter 20, a reference channel code generator 21, a power measurement device 22, a timeslot interference measurement device 24, a CQ transmitter 26 and a CQ determination device 28. The antenna 16 is coupled through the isolator/switch 18 to the matched filter 20, which receives the downlink signal and provides an output to the power measurement device 22. The reference channel code generator 21 generates a reference channel code, which is applied to the matched filter 20. The power measurement device 22 analyzes the output of the matched filter 20 to determine the power level of the downlink signal and outputs this power level to the CQ determination device 28.

The output of isolator/switch 18 is further coupled to the timeslot interference measurement device 24, which measures the downlink channel and provides an output to a second input of the CQ determination device 28. The CQ determination device 28 analyzes the power level output from the power measurement device 22 and the interference level from the timeslot interference measurement device 24 and provides a CQ measurement to the transmitter 26. The transmitter 26 is coupled to the antenna 16 through the isolator/switch 18 for wireless RF transmission to the base station 30 through wireless radio interface 14.

Base station 30 comprises a reference channel transmitter 36, an isolator or switch 34, an antenna 32, a CQ receiver 38 and a CQ storage device 40. The antenna 32 receives the wireless RF transmission from the UE, including the CQ measurement through the wireless radio interface 14, and couples via the isolator/switch 34 to the received signal to the channel quality receiver 38. The received CQ measurement is then stored at the CQ storage device 40. The reference channel transmitter 36 provides a reference signal, which is transmitted in the downlink to UE 12 through the isolator/switch 34 and the antenna 32. The reference downlink signal from the transmitter 36 is utilized by the UE 12 to create the downlink CQ measurement.

Figure 3:
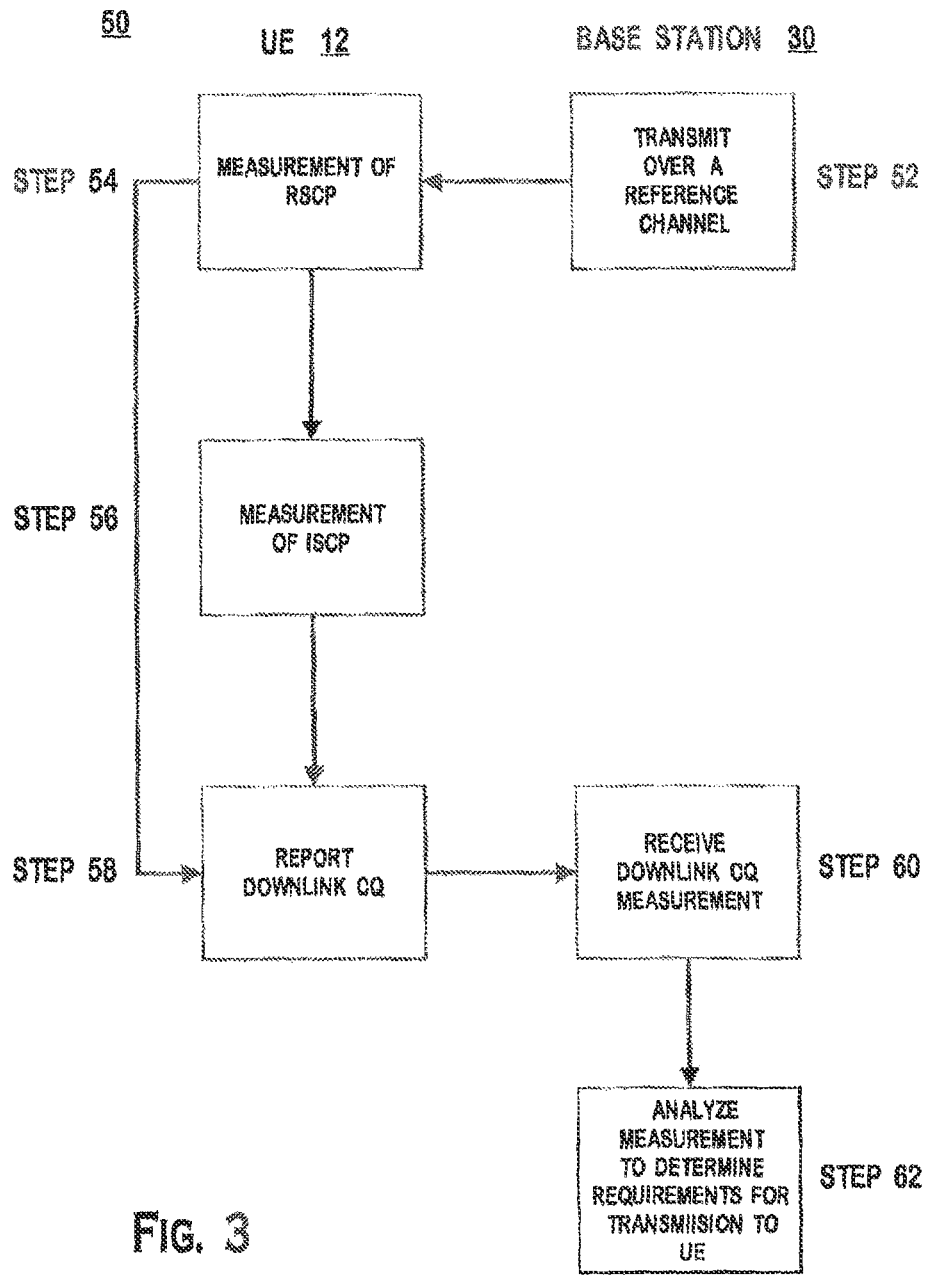
FIG. 3 is a flow diagram of one preferred method for performing channel quality measurements at the UE for downlink resource allocation of the present invention and reporting those measurements to the base station.

It should be noted that the foregoing preferred method 50 in accordance with the present invention shown in FIG. 3 may be performed by communication systems other then the types shown in FIGS. 1 and 2, and the present invention is not intended to be so limited.

Referring to FIG. 3, the method 50 may be implemented by a digital communication system 10 as explained with reference to FIGS. 1 and 2, comprising a UE 12 which is in communication with a base station 30.

A fast quality estimate per timeslot or sub-channel is one preferred technique for CQ measurement employed by the present invention to provide the best performance for the downlink (DL) allocation since the base station 30 will have all of the information needed to choose the modulation and coding, select the best user or users and to allocate to them the best timeslots or sub-channels. Although the present invention is applicable to both the UMTS frequency division duplexing (FDD) and time division duplex (TDD) standards, only one example will be set forth herein. In the FDD standard, for example, the common pilot channel (CPICH) may be measured and divided by a per-timeslot or sub-channel interference signal code power (ISCP) measurement, which is performed in all relevant timeslots. In the TDD standard the physical common pilot channel (PC-CPCH) is an example of a channel that may be measured.

The base station 30 transmits a fixed-level transmission (step 52), such as a pilot beacon or a data-carrying signal, over the PCCPCH, hereafter referred to as the reference channel. It should be understood that the reference channel may be any type of fixed-level (or known) base station transmission, whether or not it is a control channel or a data channel. It is only necessary that the reference channel power be known by the UE 12 at the time of measurement. The UE 12 measures received signal code power (RSCP) (step 54). The UE 12 then measures the ISCP (step 56). The RSCP and/or the ISCP may be measured continuously, (i.e. for every frame and timeslot), or on a less frequent basis as discussed below.

There are a number of different alternatives that can be implemented for steps 56 and 54. In a first alternative, the UE 12 measures the ISCP and/or the RSCP in specifically-identified timeslots and in a specifically-identified order. In a second alternative, the UE 12 measures the ISCP and/or the RSCP in all of the timeslots in a predetermined order or a random order. In a third alternative, the UE 12 measures the ISCP and/or the RSCP in a randomly identified number of timeslots in a random order. In a fourth alternative, the UE 12 rotates the measurement of the timeslots. For example, ISCP and/or RSCP in timeslots 1-4 of the first frame are measured, then timeslots 5-8 of the subsequent frame are measured and timeslots 9-12 of the subsequent frame, etc. By having this inherent flexibility, the method 50 in accordance with the present invention may be adapted to the particular needs of the system operator and the specific application.

As discussed above, it is not necessary to have both path loss and interference measured using the same timing scheme at the same rate. Thus, ISCP may be measured much less frequently than RSCP. For example, ISCP may be measured in accordance with the fourth alternative of Table 1 and RSCP may be measured in accordance with the second alternative of Table 1.

Table 1 summarizes the different embodiments for UE measurement. However, it should be noted that any combination of predetermined or dynamic selection of timeslots and/or timeslot order may be used without departing from the spirit and scope of the present invention.

TABLE 1

| ALTERNATIVE | UE MEASUREMENT |
| --- | --- |
| First | Measure in specific timeslots and in a specific order |
| Second | Measure in all timeslots in a predetermined or random order |
| Third | Measure in randomly identified timeslots and in a random order |
| Fourth | Rotate measurement in different timeslots |

Returning to FIG. 3, regardless of the timeslots or timeslot order that was selected and measured, the UE 12 at step 58 determines the downlink CQ from the measurements taken and reports downlink CQ to the base station 30. The CQ measurement may comprise transmitting ISCP (from step 56) and RSCP (from step 54) individually, transmitting the ISCP/RSCP ratio calculated by the UE 12, or may comprise one of many other alternatives which will be explained in further detail hereinafter.

The downlink CQ measurement report generated and transmitted by the UE 12 at step 58 is received by the base station 30 at step 60, and is analyzed at step 62 to determine the activity necessary for subsequent transmissions to the UE 12, taking into account the downlink CQ measurements.

The manner in which the UE 12 collects the measurements and transmits the measurement data is typically a trade-off between the amount of data provided, and the overhead necessary to transmit the measurement data back to the base station 30. For example, measurement and transmission of all data for both ISCP and RSCP for every selected timeslot provides the most information. However, the drawback is the large amount of data required to be transmitted and the overhead required to transmit it.

The goal of the present invention is to return timely and accurate CQ information and to determine the proper modulation and coding to use for the downlink channels. As such, there are many different alternatives that the UE 12 can use to measure and transmit this information to the base station 30. Table 2 shows the different alternatives for transmitting RSCP and ISCP to the base station 30.

TABLE 2

| ALTERNATIVE | UE TRANSMITTED INFORMATION |
| --- | --- |
| 1 | RSCP and ISCP for every timeslot |
| 2 | RSCP once per frame and ISCP for every specified timeslot |
| 3 | RSCP/ISCP ratio for every specified timeslot |
| 4 | A "coded" RSCP/ISCP ratio for every specified timeslot |
| 5 | Soft symbol errors for every specified timeslot |
| 6 | An indication of one of the available sets or levels of the modulation coding set (MCS) for each timeslot |
| 7 | A combined coding of all timeslots |
| 8 | A mean of the CQ for all timeslots (i.e., 4-5 bits) and the difference from the mean (i.e., 1 or 2 bits) for each timeslot |
| 9 | The actual measured value of one predetermined or identified timeslot or sub-channel as a reference, and then transmit the difference of the remaining timeslots from the reference timeslot. |

The nine alternatives are generally in the order from requiring the most number of bits to requiring the least number of bits to transmit the downlink CQ information from the UE 12 to the base station 30. It should be understood that this list is not an all-inclusive and the present invention should not be limited to the specific enumerated alternatives shown in Table 1.

In alternative 1, the UE 12 transmits RSCP and ISCP for every timeslot to the base station 30.

In alternative 2, the UE 12 transmits RSCP once per frame and transmits ISCP for every specified timeslot to the base station 30.

In alternative 3, the UE 12 transmits an RSCP/ISCP ratio for every specified timeslot to the base station 30.

In alternative 4, the UE 12 codes and transmits the RSCP/ISCP ratio for every specified timeslot to the base station 30. Coding of the ratio reduces the number of bits required to transmit the information.

In alternative 5, the UE 12 transmits the number soft symbol errors, detected by the UE 12, to the base station 30. Soft symbol errors are well known by those of skill in the art as an indication of downlink CQ.

In alternative 6, the UE 12 selects the available modulation coding sets (MCS) from the RSCP and ISCP measurements, and transmits this selection to the base station which the base station 30 uses for transmission. There are typically a predefined number of MCSs available to a UE, for example eight (8) such sets. Once the UE performs the RSCP and ISCP measurements, it calculates which MCSs would be supportable give the current CQ.

In alternative 7, the UE 12 combines coding of CQ information for all timeslots. Separately coding the common and differential quality of all timeslots or sub-channels results in a saving of transmitted bits.

In alternative 8, the UE 12 measures and transmits the mean of the CQs for all timeslots, which is coded using a larger number of bits, and then transmits the difference of each remaining timeslot to the mean value using coded values having a smaller number of bits. As one example, four (4) or five (5) bits may be used to identify the mean value of the timeslots, while the difference of each timeslot or sub-channel to the mean value requires only one (1) or two (2) bits.

In alternative 9, one of the timeslots or sub-channels is designated as a reference point. The CQ measurement for this timeslot is transmitted, and then for the remaining timeslots it is only necessary to transmit the differential information as referred to the reference point. In a manner similar to the alternative 8, the reference timeslot may be four (4) or five (5) bits and the difference from the reference for the remaining timeslots may be one (1) or two (2) bits.

In order to reduce power requirements as well as the complexity of the implementation necessary for measurement and processing, it is desirable to minimize the number of measurements and the amount of processing. For systems in which the UE 12 must perform measurements at all times pending information requests from the base station 30, this can impose a heavy measurement burden on the UE 12 if the number of timeslots or sub-channels are large. In situations where the interference does not change at the same rate that the fading does, timeslot measurements may be rotated in such a way that a recent interference measurement is available for some timeslots while older information is used for other slots.

By reducing the number of timeslots measured, complexity can be substantially reduced. Large numbers of timeslots to be measured results in frequent measurement reports and high complexity. A smaller number of timeslot measurements result in lower complexity but less frequent measurement reports, which leads to some degradation in performance. A compromise can be adopted according to the needs and/or preferences of the particular application.

Although the invention has been described in part by making detailed reference to the preferred embodiment, such detail is intended to be instructive rather than restrictive. It will be appreciated by those skilled in the art that many variations may be made in the structure and mode of operation without departing from the spirit and scope of the invention as disclosed in the teachings herein.

What is claimed is:

1. A user equipment comprising:
   a receiver configured to receive downlink resource allocations from a base station, wherein a received downlink resource allocation indicates to the user equipment which downlink resources of a plurality of downlink resources have been allocated to the user equipment for a downlink transmission;
   a measurement device configured to perform a plurality of downlink measurements for the plurality of downlink resources, wherein the plurality of downlink measurements are performed to determine channel quality information associated with one or more of the plurality of downlink resources;
   a channel quality determination device configured to:
      determine a first channel quality indication, wherein the first channel quality indication is used to indicate to the base station a modulation and coding set (MCS) that has been determined based on a channel quality of the plurality of downlink resources, and
      determine at least a second channel quality indication, wherein the second channel quality indication is used to indicate to the base station an MCS that has been determined based on a channel quality of a particular downlink resource of the plurality of downlink resources; and
   a transmitter configured to transmit at least one channel quality report to the base station, wherein the at least one channel quality report comprises the first channel quality indication and the second channel quality indication, and the second channel quality indication is reported as a differential channel quality with respect to the first channel quality indication.

2. The user equipment as in claim 1, wherein the received downlink resource allocation indicates to the user equipment one or more downlink transmission parameters for the downlink transmission, and the one or more downlink transmission parameters comprise an MCS used for the downlink transmission.

3. The user equipment as in claim 1, wherein other user equipments are also allocated downlink resources within the plurality of downlink resources.

4. The user equipment as in claim 1, wherein in the at least one channel quality report the second channel quality indication is reported using fewer bits than are used for reporting the first channel quality indication.

5. The user equipment as in claim 4, wherein in the at least one channel quality report the first channel quality indication is reported using 4 bits and the second channel quality indication is reported using 2 bits.

6. The user equipment as in claim 1, wherein the MCS that is determined based on the channel quality of the plurality of downlink resources is selected by the user equipment from a predefined set of available MCSs.

7. The user equipment as in claim 1, wherein each of the plurality of downlink resources correspond to a sub-channel.

8. The user equipment as in claim 1, wherein each downlink resource of the plurality of downlink resources corresponds to a timeslot.

9. The user equipment as in claim 1, wherein the at least one report comprises a second channel quality indication for each downlink resource of the plurality of downlink resources, and each of the second channel quality indications for each of the plurality of downlink resources is reported as a differential channel quality with respect to the first channel quality indication.

10. The user equipment as in claim 1, wherein the particular downlink resource is a subset of the plurality of downlink resources.

11. The user equipment as in claim 1, wherein the measurement device is configured to perform the plurality of downlink measurements based on reference signals transmitted across the plurality of downlink resources.

12. The user equipment as in claim 11, wherein the measurement device is configured to perform the plurality of downlink measurements assuming the reference signals were transmitted across the plurality of downlink resources at known or fixed power levels.

13. A method for a user equipment to feed back channel quality information for downlink resource allocation, the method comprising:
   the user equipment receiving one or more downlink resource allocations from a base station, wherein a received downlink resource allocation indicates to the user equipment which downlink resources of a plurality of downlink resources have been allocated to the user equipment for a downlink transmission;
   the user equipment performing a plurality of downlink measurements for the plurality of downlink resources, wherein the plurality of downlink measurements are performed to determine channel quality information associated with one or more of the plurality of downlink resources;
   the user equipment determining a first channel quality indication, wherein the first channel quality indication is used to indicate to the base station a modulation and coding set (MCS) that has been determined based on a channel quality of the plurality of downlink resources;
   the user equipment determining a plurality of second channel quality indications, wherein a respective second channel quality indication is determined for each of the plurality of downlink resources, and each second channel quality indication is used to indicate to the base station an MCS that has been determined based on a channel quality of a respective downlink resource of the plurality of downlink resources; and the user equipment transmitting at least one channel quality report to the base station, wherein the at least one channel quality report comprises the first channel quality indication and the plurality of second channel quality indications, and each of the plurality of second channel quality indications is reported as a differential channel quality with respect to the first channel quality indication.

14. The method as in claim 13, wherein in the at least one channel quality report each of the plurality of second channel quality indications is reported using fewer bits than are used for reporting the first channel quality indication.

15. The method as in claim 14, wherein in the at least one channel quality report the first channel quality indication is reported using 4 bits and each second channel quality indication is reported using 2 bits.

16. The method as in claim 13, wherein the MCS that is determined based on the channel quality of the plurality of downlink resources is selected by the user equipment from a predefined set of available MCSs.

17. The method as in claim 13, wherein the user equipment performs the plurality of downlink measurements based on reference signals transmitted across the plurality of downlink resources.

18. The method as in claim 17, wherein the user equipment performs the plurality of downlink measurements assuming the reference signals were transmitted at known or fixed power levels.

19. A method for a base station to perform downlink resource allocation, the method comprising:

the base station transmitting reference signals across a plurality of downlink resources;

the base station receiving channel quality reports from a plurality of user equipments, wherein a first channel quality report received from a first user equipment comprises a first channel quality indication and a second channel quality indication, the first channel quality indication indicates to the base station a modulation and coding set (MCS) that the first user equipment has selected based on the channel quality of the plurality of downlink resources, the second channel quality indication indicates to the base station an MCS that the first user equipment has selected based on the channel quality of a particular downlink resource of the plurality of downlink resources, and the second channel quality indication is reported as a differential channel quality with respect to the first channel quality indication;

the base station determining how to allocate the plurality of downlink resources to at least the plurality of user equipments based on at least the channel quality reports received from the plurality of user equipments;

the base station transmitting one or more downlink resource allocations to one or more of the user equipments, wherein at least one downlink resource allocation is sent to the first user equipment, and the downlink resources allocated to the first user equipment in the at least one downlink resource allocation are selected by the base station based on at least the first channel quality report; and the base station sending a downlink transmission to the first user equipment in accordance with the at least one downlink resource allocation.

20. The method as in claim 19, further comprising the base station transmitting at least a second downlink resource allocation to a second user equipment, wherein the second downlink resource allocation allocates different downlink resources to the second user equipment than were allocated to the first user equipment.

21. A user equipment comprising:

a receiver configured to receive downlink resource allocations from a base station, wherein at least one received downlink resource allocation indicates to the user equipment that one or more downlink resources of a plurality of downlink resources have been allocated to the user equipment for a downlink transmission;

a channel quality determination device configured to:
  determine a first channel quality indication, wherein the first channel quality indication indicates a modulation and coding set (MCS) that has been selected based on a channel quality of the plurality of downlink resources, and
  determine at least a second channel quality indication, wherein the second channel quality indication indicates an MCS that has been selected based on a channel quality of a particular downlink resource of the plurality of downlink resources; and a transmitter configured to transmit at least one channel quality report to the base station, wherein the at least one channel quality report comprises the first channel quality indication and the second channel quality indication, and the second channel quality indication is reported as a differential channel quality with respect to the first channel quality indication.

22. The user equipment as in claim 21, wherein the channel quality determination device is configured to select the MCS from a predefined set of available MCSs based on the channel quality of the plurality of downlink resources.

23. The user equipment as in claim 21, wherein in the at least one channel quality report the first channel quality indication is reported using 4 bits and the second channel quality indication is reported using 2 bits.

24. The user equipment as in claim 21, wherein each of the plurality of downlink resources correspond to a sub-channel.

25. The user equipment as in claim 21, wherein the channel quality determination device is configured to determine a respective second channel quality indication for each of the plurality of downlink resources, and each respective second channel quality indication is reported as a differential channel quality with respect to the first channel quality indication in the at least one channel quality report.

26. The user equipment as in claim 21, wherein the at least one received downlink resource allocation indicates to the user equipment one or more downlink transmission parameters to be used for the downlink transmission.

27. A user equipment comprising:

a measurement device configured to perform downlink measurements for a plurality of downlink resources, wherein one or more of the plurality of downlink resources can be allocated to the user equipment for a downlink transmission from a base station;

a channel quality determination device configured to:
  determine a first channel quality indication for the plurality of downlink resources, wherein the first channel quality indication indicates to the base station a modulation and coding set (MCS), and
  determine a second channel quality indication for each of the plurality of downlink resources, wherein each second channel quality indication indicates to the base station an MCS for one downlink resource of the plurality of downlink resources;

a transmitter configured to transmit a channel quality report to the base station, wherein the channel quality report comprises the first channel quality indication and the plurality of second channel quality indications, and each of the plurality of second channel quality indications is reported as a differential channel quality with respect to the first channel quality indication; and a receiver configured to receive at least one downlink resource allocation from the base station, wherein the at least one downlink resource allocation indicates a downlink transmission is to be sent to the user equipment using one or more of the plurality of downlink resources.

28. The user equipment as in claim 27, wherein in the channel quality report each second channel quality indication is reported using fewer bits than are used for reporting the first channel quality indication.

29. The user equipment as in claim 27, wherein in the channel quality report the first channel quality indication is reported using 4 bits and each second channel quality indication is reported using 2 bits.

30. The user equipment as in claim 27, wherein the measurement device is configured to perform the downlink measurements for the plurality of downlink resources based upon reference signals associated with the plurality of downlink resources that are transmitted power levels known to the user equipment.

31. The user equipment as in claim 27, wherein each of the plurality of downlink resources correspond to a timeslot or a sub-channel.

32. The user equipment as in claim 31, wherein the plurality of downlink resources correspond to a first sub-channel, and the first sub-channel corresponds to a reference resource.

33. A method implemented by a user equipment, the method comprising:

the user equipment performing downlink measurements for a plurality of downlink resources, wherein one or more of the plurality of downlink resources can be allocated to the user equipment for a downlink transmission from a base station;

the user equipment determining a first channel quality indication for the plurality of downlink resources, wherein the first channel quality indication indicates to the base station a modulation and coding set (MCS);

the user equipment determining a second channel quality indication for each of the plurality of downlink resources, wherein each second channel quality indication indicates to the base station an MCS for one downlink resource of the plurality of downlink resources;

the user equipment transmitting a channel quality report to the base station, wherein the channel quality report comprises the first channel quality indication and the plurality of second channel quality indications, and each of the plurality of second channel quality indications is reported as a differential channel quality with respect to the first channel quality indication; and the user equipment receiving at least one downlink resource allocation from the base station, wherein the at least one downlink resource allocation indicates a downlink transmission is to be sent to the user equipment using one or more of the plurality of downlink resources.

34. The method as in claim 33, wherein in the channel quality report each second channel quality indication is reported using fewer bits than are used for reporting the first channel quality indication.

35. The method as in claim 33, wherein in the channel quality report the first channel quality indication is reported using 4 bits and each second channel quality indication is reported using 2 bits.

36. The method as in claim 33, wherein the user equipment performs the downlink measurements for the plurality of downlink resources based upon reference signals associated with the plurality of downlink resources that are transmitted power levels known to the user equipment.

* * * * *

(12) INTER PARTES REVIEW CERTIFICATE (3456th)
United States Patent
Terry et al.

(10) Number: US 9,456,449 K1
(45) Certificate Issued: Feb. 16, 2024

(54) CHANNEL QUALITY MEASUREMENTS FOR DOWNLINK RESOURCE ALLOCATION

(71) Applicant: INTERDIGITAL TECHNOLOGY CORPORATION

(72) Inventors: Stephen E. Terry; Stephen G. Dick; James M. Miller; Eldad Zeira; Ariela Zeira

(73) Assignee: INTERDIGITAL TECHNOLOGY CORPORATION

Trial Number:

IPR2020-01494 filed Aug. 27, 2020

Inter Partes Review Certificate for:

Patent No.: 9,456,449
Issued: Sep. 27, 2016
Appl. No.: 14/055,315
Filed: Oct. 16, 2013

The results of IPR2020-01494 are reflected in this inter partes review certificate under 35 U.S.C. 318(b).

INTER PARTES REVIEW CERTIFICATE
U.S. Patent 9,456,449 K1
Trial No. IPR2020-01494
Certificate Issued Feb. 16, 2024

AS A RESULT OF THE INTER PARTES REVIEW PROCEEDING, IT HAS BEEN DETERMINED THAT:

Claims 9, 13-18, 25 and 27-36 are found patentable.

Claims 1-8, 10-12, 21-24 and 26 are cancelled.

\* \* \* \* \*